Patented Mar. 17, 1936

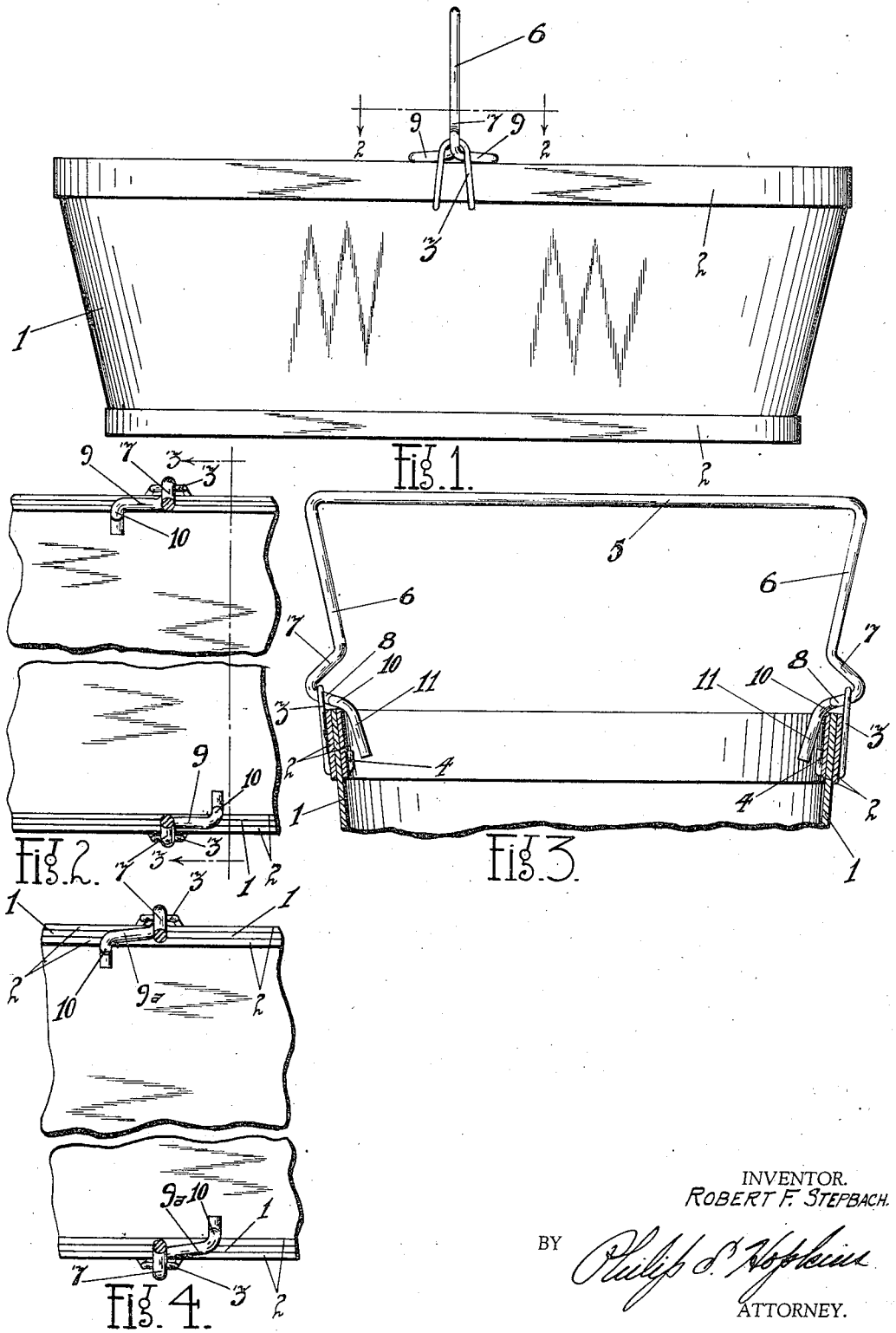

2,034,066

UNITED STATES PATENT OFFICE 2,034,066

BASKET HANDLE

Robert F. Stepbach, Binghamton, N. Y., assignor, by direct and mesne assignments, of one-half to E. H. Titchener & Co., Binghamton, N. Y., a corporation of New York, and one-half to Mushroom Supply Co., Toughkenamon, Pa.

Application July 14, 1933, Serial No. 680,396

6 Claims. (Cl. 217—125)

My invention relates to basket handles and particularly to handles for the type of baskets or boxes usually used for mushrooms, fruit, berries, grapes, vegetables, and other like goods.

The general practice is to fill such baskets directly during the picking process, the baskets being carried to the field or orchard for use by the pickers.

The handles provided for baskets of this type have in the past been of two kinds, the fixed type which are permanently attached to the baskets as by causing the ends of the handle to pierce the sides of the basket and being bent thereon to fixedly secure the handle in position, and the attachable type which are attached to the baskets when the same are ready for use by passing the ends of the handles through loops or the like provided on the baskets and which, although securely fixed to the baskets and removable therefrom as distinguished over the first type mentioned in which the handles are permanently secured.

The permanently secured type of handle has been found objectionable from the standpoints that it is more expensive and much less convenient in that it requires additional operations for fastening the same in position and does not permit the convenient transportation of baskets so equipped to the field or orchard where they are to be filled inasmuch as the handle interferes with the nesting of the baskets. Consequently the attachable type of handle which may be quickly and readily placed on the basket ready for use by the picker has marked advantages. The difficulty with this readily attachable type of handle, however, has been that when the same is hooked or otherwise placed on the basket, no means are provided for holding it upright in carrying position with the result that it drops down on the top of the basket where it is in the way and interferes with rapid filling of the basket and must be picked up each time it is desired to move the basket. When the basket is nearly filled this oftentimes results in bruising the fruit, mushrooms or other articles in the basket by the hand of the operator endeavoring to get his hand under the handle.

To correct this difficulty and still utilize the advantages of the attachable type of handle, I have provided a handle which may be quickly and readily attached to the basket at the time of use thereof and which when attached is securely positioned on the basket without piercing the same or otherwise permanently fastening the same thereto and which in addition is automatically maintained at all times in its upright carrying position.

This constitutes the primary object of my invention, namely, the provision of a readily attachable handle which when placed in position on the basket is automatically and fixedly maintained in upright carrying position.

More specifically it is the object of this invention to provide a handle provided with ends bent or formed in such a manner as to readily engage the fastening loops provided on the basket to securely fasten the handle thereto, such ends being so arranged as to cooperate with the edges of the basket to prevent the handle falling down or assuming any position other than an upright carrying position.

Another object of my invention lies in the provision of a handle of this type which is simple and economical to manufacture, easily attached to the basket, and which embodies the various desirable features of a handle for this purpose.

Basket handles of this type are usually formed of wire bent to the desired shape. I have illustrated my improved handle in this wire form but it will be understood that I do not limit myself to wire as the invention is obviously adaptable to handles of other materials which may be bent or formed as disclosed herein.

In the drawing:

Figure 1 is a side view of a conventional type of basket to which my improved handle is attached.

Figure 2 is a sectional view taken on the line 2—2 of Figure 1, the bottom of the basket being broken for convenience.

Figure 3 is a sectional view taken on the line 3—3 of Figure 2.

Figure 4 is a view similar to Figure 2 and illustrating a slightly modified bend on the ends of the handle.

The reference character 1 refers generally to a basket which may be of any desired shape or size and which is provided with the usual reinforcing strips 2 at the top and bottom edges of the sides of the basket. As shown clearly in Figures 2 and 3, these reinforcing strips 2 are provided on both the inner and outer sides of the basket around its upper edge.

Disposed centrally of the basket 1 and on opposite sides thereof in substantial alignment are the handle loops 3 preferably formed of wire and bent to the form shown clearly in Figures 1 and 3 with the loop portion extending slightly above the upper edge of the basket and the ends thereof passing through the reinforced portion of the basket and bent back upon the inner surface of the inner strip 2, as at 4, whereby the loops are permanently and securely fixed to the basket.

My improved handle is preferably formed of a single length of wire bent to provide the straight hand grip portion 5 spaced substantially above the top of the basket by the inwardly and downwardly extending side lengths 6. At the lower end of the side portions 6 of the handle, the material is bent outwardly and downwardly as at 7 and then inwardly to provide the loop engaging portions 8. It will be understood, of course, that the distance between the bends formed by the juncture of the portions 7 and 8 on each end of the handle is sufficient to permit engagement with the loops 3 as shown clearly in Figure 3. The angle of bend between the portions 7 and 8 is fairly small and the portion 8 is relatively short but sufficient for substantial engagement with the loop 3 through which it passes.

As shown clearly in Figures 1 and 2, the portions 5, 6, 7 and 8 of the handle all lie in substantially the same plane. At the inner ends of the portions 8, however, the wire is bent at substantially right angles to provide the portions 9 which directly overlie and are substantially parallel with the upper edges of the basket. As shown clearly in Figures 1, 2 and 3, and particularly in Figure 2, these portions 9 are bent in opposite directions, one extending to one side of the carrying loops 3 and the other extending on the opposite side. At the ends of the portions 9 the wire is again bent sharply inwardly as at 10 at substantially right angles to the portions 9 to points just inside the upper edges of the basket at which points the wire is bent downwardly and slightly inwardly as at 11. These portions 11 when the handle is attached to the basket, lie directly adjacent and in engagement with the inner top edges of the basket as shown clearly in Figure 3. The extreme ends of the handle extend slightly inwardly to facilitate the attaching of the handle to the basket.

It will be obvious from the foregoing that with the handle attached through the loops 3 and to the basket as shown clearly in Figures 2 and 3, the portions 8 provide adequate lifting means for the loops 3 whereby to support the handle on the basket and the portions 9 being disposed in opposite directions along the upper edge of the basket, effectively prevents the handle from turning in the loops and dropping down upon the top of the basket. Thus the handle is always securely maintained in upright carrying position.

The handle is quickly and readily attached by inserting first one end thereof through one of the loops 3 and then the other end, squeezing the top edges of the basket slightly together to facilitate the insertion of the second end. Once attached the handle is firmly fixed in position and because of the novel end formation of the handle, the same always remains in upright carrying position.

In Figure 4 a very slight modification is illustrated, the only difference over the forms shown in Figures 1, 2 and 3, being that the portions 9a, corresponding to the portions 9 previously described, are disposed slightly angular with respect to the top edge of the basket formed by the upper edge of the basket 1 and the reinforcing strips 2. This slightly angular disposition of the portions 9a has been found practical and convenient for baskets and handles of substantially heavy construction as it facilitates the insertion of the ends of the handle through the loops 3.

In the foregoing description where the terms "inwardly" and "outwardly" have been used with reference to the disposition of portions of the handle, I have had reference by such terms to directions toward each other and away from each other respectively as regards the opposite ends of the handle.

Thus I have provided a basket handle which may be transported to the field or orchard separate from the basket and in convenient quantities and when ready for use may be quickly and readily attached to the basket without piercing the same and which when attached is automatically maintained in its upright carrying position whereby it is always ready for convenient lifting of the basket and in which position it is out of the way of the basket filling process.

Of course, changes may be made in detail without departing from the spirit and scope of my invention. I do not limit myself, therefore, to the exact form herein shown and described other than by the appended claims.

I claim:

1. In combination, a basket having supporting loops thereon, a handle having a hand grip portion and end portions, said end portions passing through said loops and then turned longitudinally of the basket and overlying the upper edge of said basket in opposite directions, said end portions then being bent downwardly adjacent the inner surface of the upper edge of said basket, whereby said handle is maintained in upright position.

2. A basket handle having a hand grip portion and basket engaging ends, said ends being bent to provide loop engaging portions, then bent angularly in opposite directions to each other to provide portions for overlying engagement with the upper edge of a basket, and then bent downwardly for engagement with the inner surface of a basket.

3. A basket handle comprising a hand grip portion and basket engaging ends, said ends being bent to provide loop engaging portions, then bent angularly in opposite directions to each other, then bent inwardly toward each other and then bent downwardly.

4. A basket handle comprising a hand grip portion and basket engaging ends, said ends being bent to provide loop engaging portions, then bent angularly in opposite directions to each other, then bent inwardly toward each other and then bent downwardly, the extreme ends extending slightly inwardly towards each other.

5. A basket handle comprising a hand grip portion and basket engaging ends, said ends being bent to provide loop engaging portions, then bent angularly in opposite directions to each other, then bent inwardly toward each other and then bent downwardly, the hand grip portion and the loop engaging portions all lying in substantially the same plane.

6. A basket handle comprising a hand grip portion and basket engaging ends, said ends being bent to provide loop engaging portions, then bent angularly in opposite directions to each other, then bent inwardly toward each other and then bent downwardly, the hand grip portion and the loop engaging portions all lying in substantially the same plane, and the angular portions being at substantially right angles to said plane.

ROBERT F. STEPBACH.